United States Patent [19]

Kafka et al.

[11] Patent Number: 5,009,030
[45] Date of Patent: Apr. 23, 1991

[54] SUBSTRATE FOR SOIL-FREE CULTURE HAVING A CONTROLLED WATER CONTENT OVER ITS THICKNESS

[75] Inventors: Bernard Kafka, Rantigny; Michel Baufume, Barbery, both of France

[73] Assignee: Isover Saint-Gobain, Aubervilliers, France

[21] Appl. No.: 251,831

[22] Filed: Oct. 3, 1988

[51] Int. Cl.⁵ ............................................. A01G 31/00
[52] U.S. Cl. ......................................... 47/64; 47/87; 47/59
[58] Field of Search ............... 47/59, 60, 61, 62, 63, 47/64, 65, 87; 71/64.13, 903, 904

[56] References Cited

U.S. PATENT DOCUMENTS

| | | |
|---|---|---|
| 4,777,763 | 10/1988 | Shannon ................................. 47/74 |
| 4,794,728 | 1/1989 | Tsukada ................................. 47/64 |

FOREIGN PATENT DOCUMENTS

| | | | |
|---|---|---|---|
| 0201426 | 11/1986 | European Pat. Off. ................ 47/64 |
| 0300536 | 1/1989 | European Pat. Off. ................ 47/62 |
| 8901736 | 3/1989 | PCT Int'l Appl. ..................... 47/62 |
| 1161021 | 6/1985 | U.S.S.R. ................................. 47/59 |

Primary Examiner—David A. Scherbel
Assistant Examiner—Jerrold D. Johnson
Attorney, Agent, or Firm—Oblon, Spivak, McClelland, Maier & Neustadt

[57] ABSTRACT

Substrates for soil-free culturing are formed from a felt of mineral fibres having a hydroretentivity gradient such that the hydroretentivity decreases in the direction of gravity. The hydroretentivity gradient may be brought about by a gradient in the fineness of the fibres such that the average diameter of the fibres increases in the direction of gravity or the density of the fibres.

14 Claims, 3 Drawing Sheets

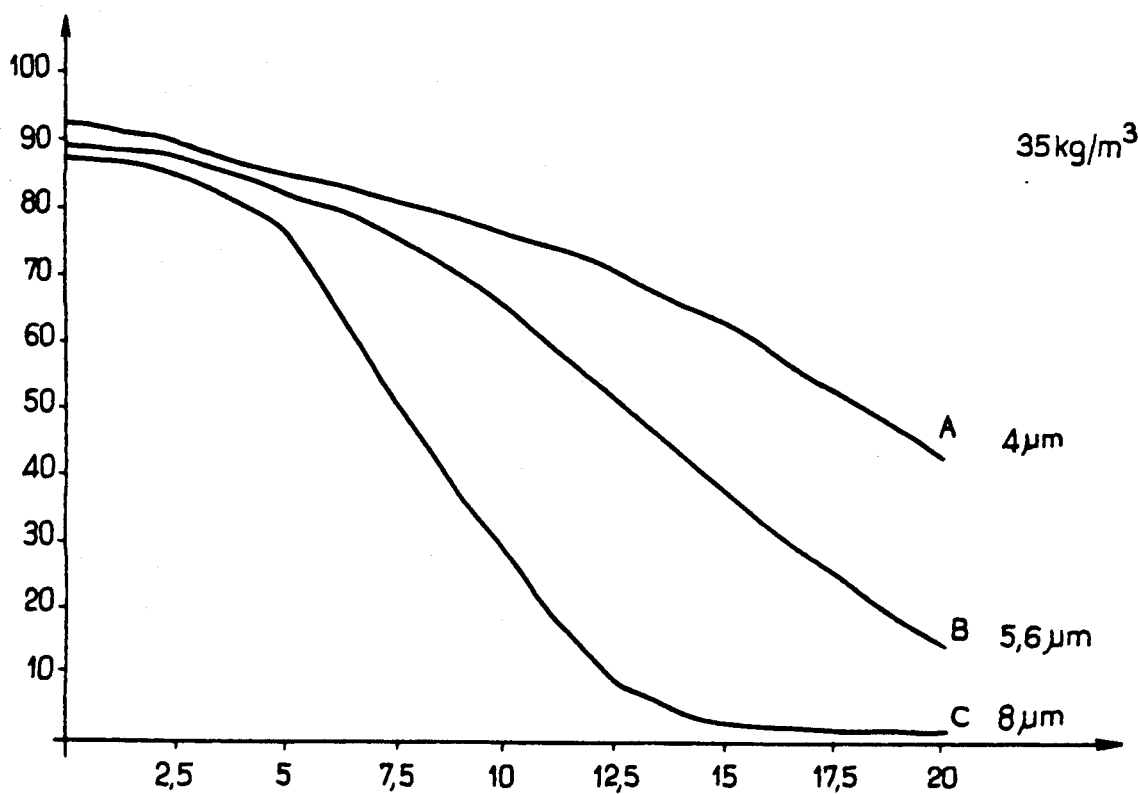
FIG_1
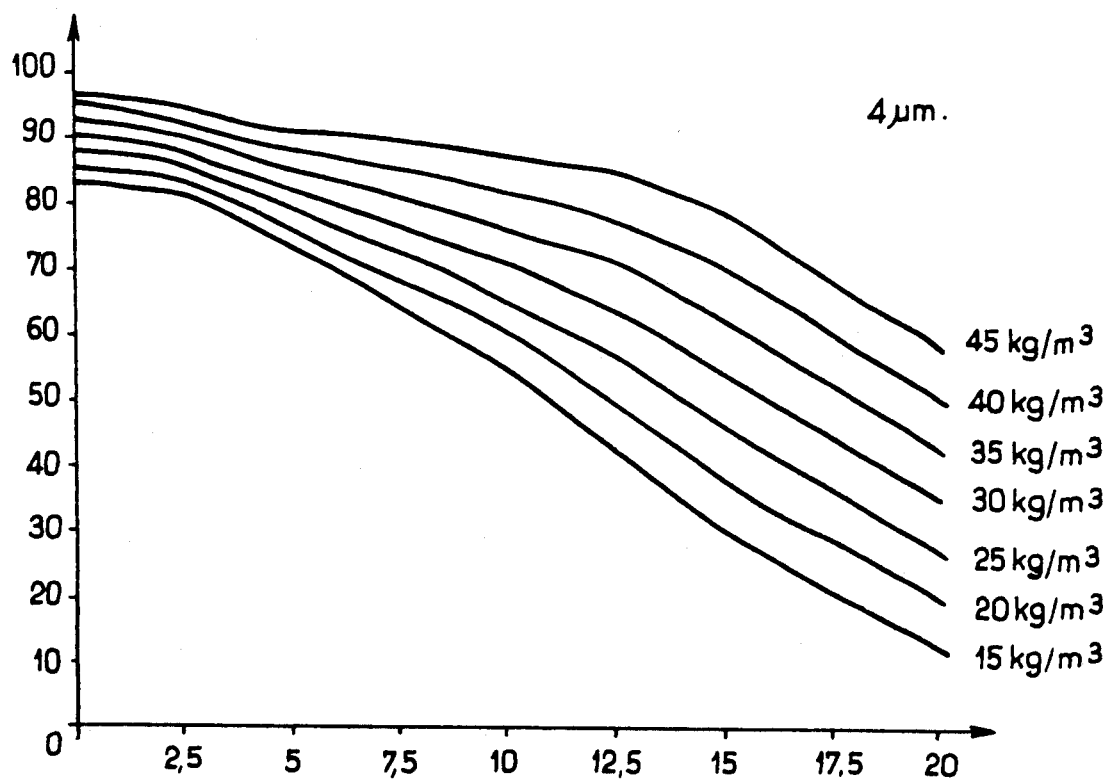
FIG_2

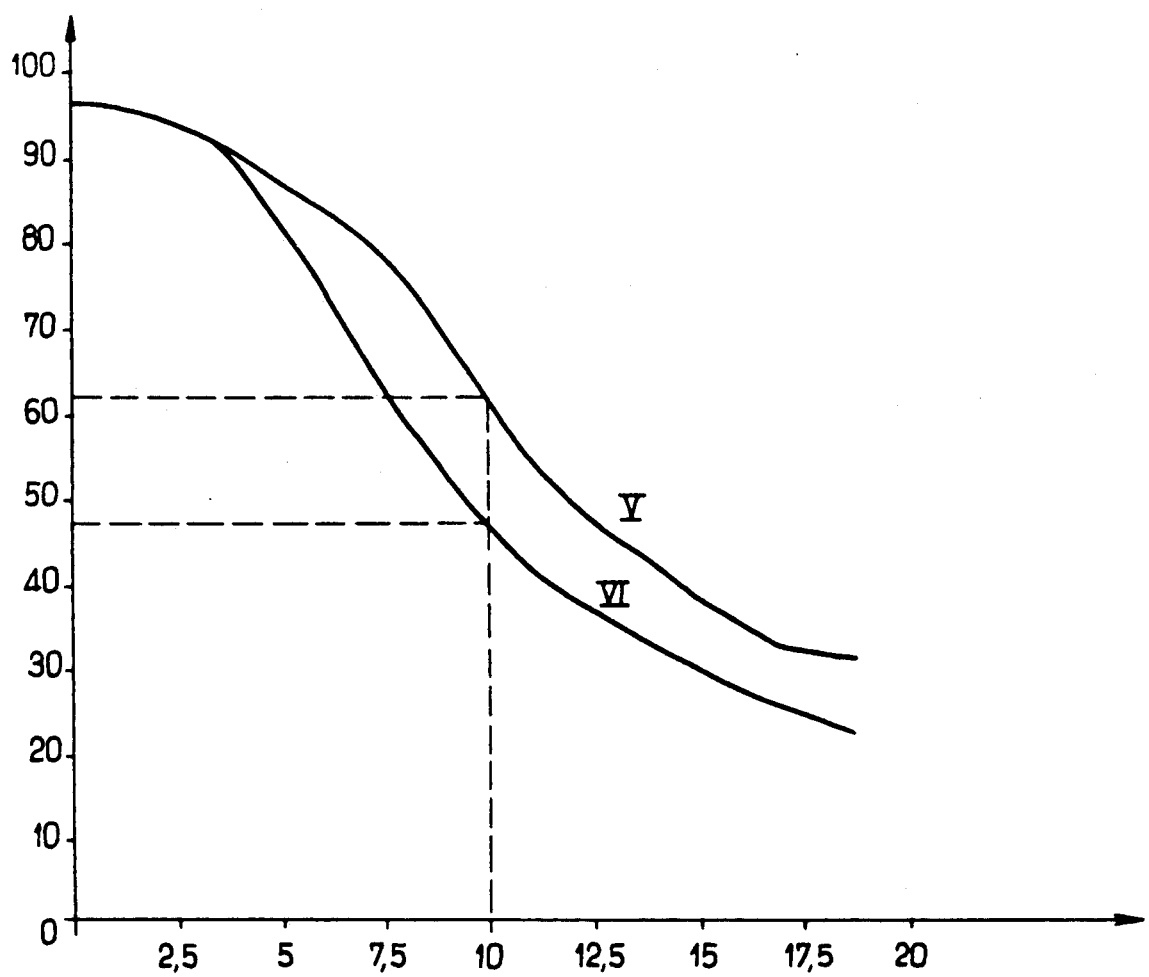
FIG_5
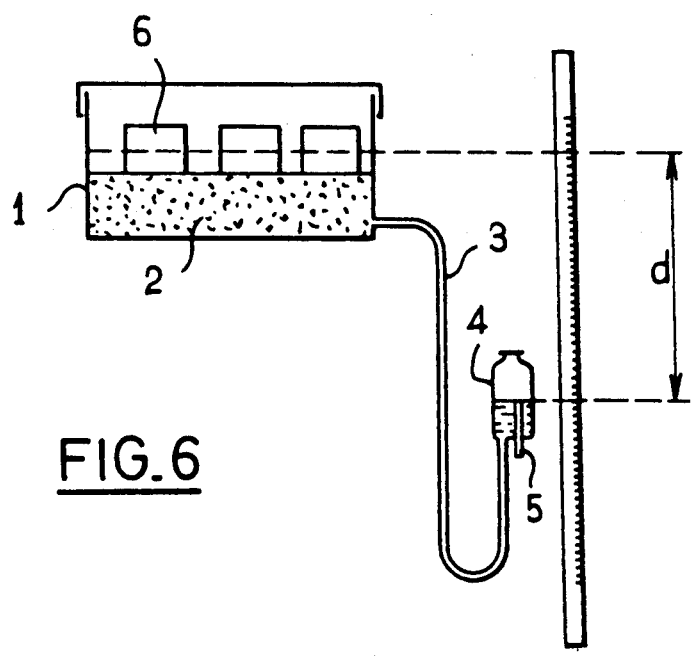
FIG_6

SUBSTRATE FOR SOIL-FREE CULTURE HAVING A CONTROLLED WATER CONTENT OVER ITS THICKNESS

BACKGROUND OF THE INVENTION

1. Field of the Invention

The present invention concerns substrates for soil-free culture, in particular substrates which have a water content controlled over their thickness.

2. Background of the Prior Art

It is important, for the growth of plants, that the substrate medium contains air and can absorb and retain water or nutrient aqueous solutions.

There have been proposed, for soil-free culture, substrates based on mineral fibres, such as rock wool or glass fibres, because these substrates have the advantage of being highly porous, the fibres occupying generally at most 5% of the total volume of the substrates. They can act as supports for roots, as a reserve for air and water or nutrient solutions; furthermore they are light and chemically inert.

The present description will refer, for convenience, to the supply of water to the substrates; however, it is to be understood that all aqueous nutrient solutions suitable for plants may be used.

The retention of water, or hydroretention, of a substrate is an important characteristic for the procedure of plant culturing. The conditions of humidity can vary according to various factors such as the type of plants to be cultivated, the climate, the seasons, and the stage of development of the plant. Whatever the desired humidity conditions for a particular type of substrate, it is necessary for the water to be absorbed and retained to a certain extent by the substrate. The water should not drain away immediately, but rather it should remain available to the plant. In fact, water or an aqueous solution which is too strongly bound to the substrate or which drains away too quickly cannot be satisfactorily utilised by the plant.

The substrates based on mineral fibres, as a result of their characteristics, give satisfactory results when they are used for soil-free culture. However, they still display one disadvantage; at the time of use the substrates are positioned on impermeable supports and are generally supplied with water by percolation. The water flows under gravity across the substrate. The lower part of the substrate remains in contact with the water by virtue of its capillary nature. The lower part of the substrate thus contains more water and less air than the upper part. The characteristics of water/air distribution are thus not the same over the whole thickness of the substrate; the roots develop in a non-uniform manner within the substrate as a whole; which is harmful to the plant and reduces the effectiveness of the substrate.

SUMMARY OF THE INVENTION

According to the invention, a new substrate is provided which does not suffer from the above-mentioned disadvantage and which, in particular, exhibits a water content which is controlled and constant over the thickness of the substrate.

According to the invention, the substrate for soil-free culture, suitable for supplying plants with water or nutrient solutions, is formed of a felt of mineral fibres, which is characterised by a heterogeneous structure displaying a hydroretentivity gradient such that the hydroretentivity decreases in the direction of gravity when used, i.e., it decreases in the direction of the surface to be placed on the support. This hydroretentivity gradient compensates for the effect of gravity and allows there to be obtained, within the thickness of the substrate and at the time of use, the desired water content.

The hydroretention of the substrate corresponds to its ability to absorb and retain water.

In order to determine the quantity of water retained by a substrate, referred to as hydroretention, after having been saturated with water the substrate is submitted to suction forces or similarly applied pressure and its water content is determined as a function of these forces. Thus, for a given applied suction expressed in depression of the height of a water column or centimetres of water, the volume of water which is contained within the substrate and which represents a certain percentage of the volume of the substrate, is defined.

Two values suffice, in a conventional manner, as reference to determine the retention of water or hydroretention of a substrate; the volume percentage of water which is retained by the substrate under a suction applied by lowering a water reservoir 10 cm (depression of 10 cm of water) and the volume percentage of water which is retained by the substrate under a depression of 20 cm of water. The substrate displays satisfactory hydroretention when the volume of water which is extracted between these two values and which corresponds to the available water, is large.

It is established that the volume percentage of water retained by substrates is high under a depression of 10 cm of water, and it is generally low under depression of 20 cm of water. To differentiate between different substrates with regard to their hydroretention, reference is therefore made to the volume percentages obtained at a depression of 10 cm of water.

Various procedures exist for determining the hydroretention of a substrate. That which was used for the present invention is described hereinafter.

As has been indicated, in a substrate formed of mineral fibres, less than 5% of its volume is occupied by the fibres. 95% Of the volume of the substrate can therefore be occupied by air and water. In general, a substrate having a satisfactory hydroretention contains at least about 50% of water, at a depression of 10 cm of water, and this value can be different for a particular type of culture.

In the conventional substrates, the distribution of water is not constant over the whole thickness as a result of gravity, and this is detrimental to good plant growth. The control of hydroretention over the whole thickness of the substrate, in accordance with the invention, permits this disadvantage to be alleviated.

BRIEF DESCRIPTION OF THE DRAWINGS

In the attached drawings, given only by way of example,

FIG. 1 shows graphs of the hydroretention of conventional substrates of the same average density, but containing fibres having different average diameters.

FIG. 2 shows graphs of the hydroretention of conventional substrates containing fibres of the same average diameter, but of different average densities.

FIGS. 3, 4 and 5 show graphs of hydroretention of substrates I, III and V, in accordance with the invention and substrates II, IV and VI of identical structure but utilised under conditions not in accordance with the invention.

FIG. 6 shows apparatus for the determination of hydroretention.

DETAILED DESCRIPTION OF THE INVENTION

Figure 3:
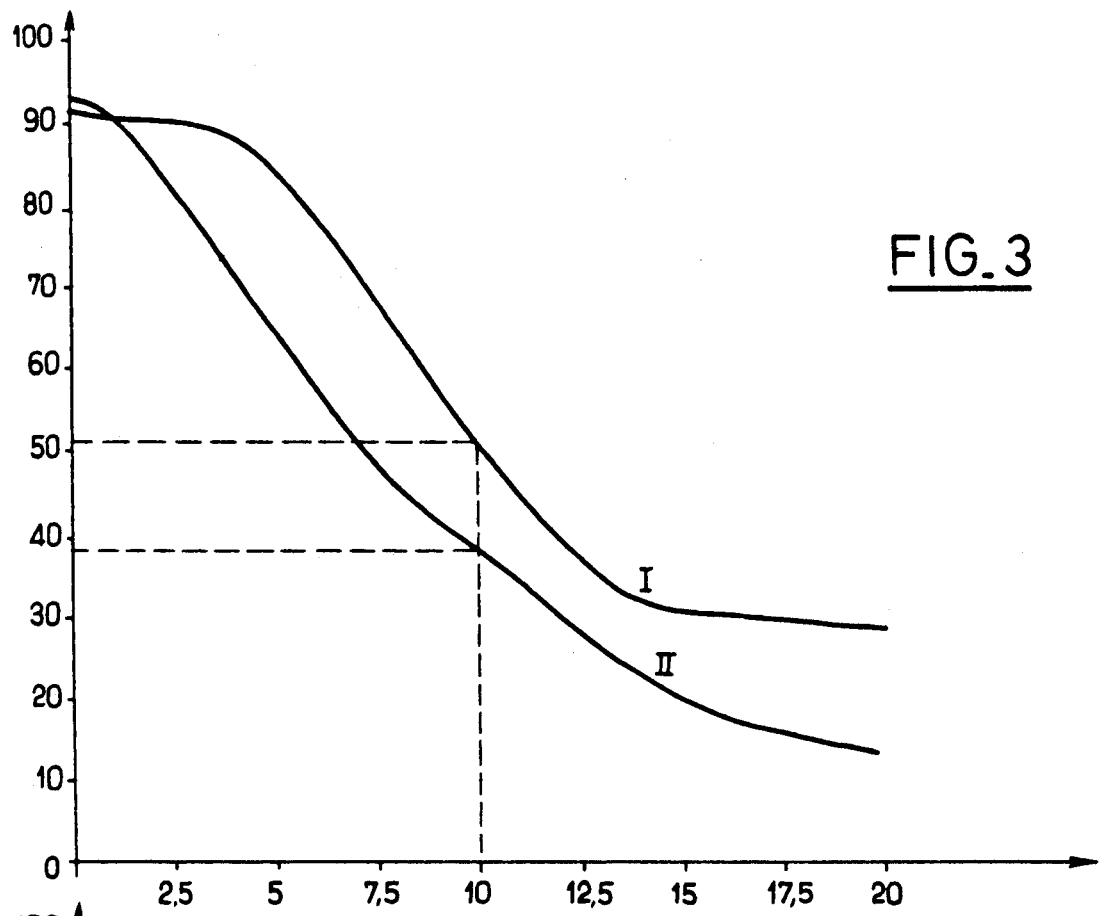

The hydroretentivity is associated with the capillarity of the felt which forms the substrate. The capillarity depends on the diameter of the fibres, and thus on their fineness, and the density of the felt obtained from the fibres.

It has been noted that, for the same density, the hydroretentivity of a felt increases with the fineness of the fibres.

FIG. 1 shows graphs of hydroretention (volume percentage of water as a function of the pressure applied expressed in centimeters of water) of conventional substrates A, B, and C, which are not in accordance with the invention, formed of a felt 75 mm in thickness and having an average density of 35 kg/m$^3$. These substrates contain glass fibres of differing average diameters; for substrate A, the average diameter of the fibres is 4 $\mu$m, for substrate B, it is 5.6 $\mu$m and for substrate C, it is 8 $\mu$m. It can be established that the substrate which displays the highest hydroretention is that which is formed from the finest fibres, i.e., substrate A.

With felts which contain fibres of the same average diameter, the hydroretentivity decreases when the average density decreases.

FIG. 2 shows hydroretention curves for substrates containing fibres of the same average diameter, 4 $\mu$m, but having different average densities. It has been established that the greatest hydroretention is obtained with the substrate having the highest average density.

In order to obtain substrates which display a particular water content over their whole thickness, with a minimum accumulation of water in their lower part as a result of gravity, the invention provides a substrate which is formed of a heterogeneous structure of which the hydroretentivity decreases in the direction of gravity, as a result of the existence of a density gradient within the thickness of the substrate.

In particular, a substrate in accordance with the invention can be formed of a felt of mineral fibres of the same average diameter, but having a density which decreases over the thickness of the substrate in the direction of gravity.

Another substrate according to the invention comprises a heterogeneous fibrous structure having a hydroretentivity gradient resulting from a gradient in the fineness of the fibres over the thickness of the substrate.

Such a substrate, in accordance with the invention, is, for example, formed of a felt of mineral fibres having a predetermined average density and having an average fibre diameter which increases in the direction of gravity.

The density of the felts utilised for substrates in accordance with the invention can vary greatly. It is generally from 15 to 60 kg/m$^3$ and preferably from 20 to 30 kg/m$^3$.

The average diameter of the fibres may have any appropriate value. It is generally between 2 $\mu$m and 12 $\mu$m and preferably between 4 $\mu$m and 8 $\mu$m. Fibres having a diameter less than 2 $\mu$m are not preferred because they result in felts having a high hydroretentivity; the air content would be small and would bring about asphyxiation of the roots; besides, felts prepared from such fine fibres display low resistance to mechanical forces. Fibres having a diameter greater than 12 $\mu$m would form felts having poor hydroretention.

The hydroretentivity gradient as previously defined can also be obtained by density and fineness gradients over the thickness of the substrate.

Whatever the direction of variation of the density and/or the fineness may be, the felts forming the substrates according to the invention must display a hydroretentivity which decreases in the direction of gravity; thus the fibres which are located close to the upper surface have characteristics which allows them to retain more water than those situated at the bottom of the substrate.

The accumulation of water in the lower part of the substrate caused by gravity is thus reduced.

A culture may necessitate the use of a particular substrate, displaying a specific hydroretention, which depends particularly, as has already been said, on the plant itself, the climate, and the seasons. By virtue of the invention there may be obtained a substrate which is appropriate to every culture by varying in a suitable manner the characteristics of density and diameter of the fibres of the felt used to form the substrate.

The invention thus permits control of the water content of the substrate by creating a hydroretentivity gradient within a felt which constitutes a substrate, in which water content may be constant or may vary over the whole thickness of the substrate, according to the intended use. In particular, good results are obtained when the hydroretentivity is very high within the upper part of the substrate. That is particularly so when the upper part of the substrate contains fibres of very small average diameter, for example between 2 $\mu$m and 5 $\mu$m, or has a high density for example between 30 and 60 kg/m$^3$.

The substrates according to the invention can display density and/or fineness gradients by varying the density and/or the diameters progressively over the whole thickness of the substrate. The substrates can also be formed of several distinct layers each of which displays density and fibre fineness characteristics appropriate to obtain the desired result, i.e., a hydroretentivity which decreases in the direction of gravity.

In order to determine the layers of fibres that are to form the substrate, reference is made to their weight per unit area (g/m$^2$) which depends on the density and the thickness. Each layer can display a different or the same weight per unit area, for example from 300 g to 2500 g/m$^2$. The number of layers forming the substrate can vary depending on the desired result. Substrates can be used having from 2 to 8 layers of fibres and preferably having at least three layers. A high number of layers permits the hydroretentivity gradient to be finely controlled over the whole thickness of the substrate.

The overall thickness of the substrate can be varied depending on the final use. It is most often of the order of 70 mm to 75 mm. The substrates may have greater or lesser thickness; however, the thickness should be sufficient to permit satisfactory development of the roots and a good supply to the plants of water or nutrient solutions.

The substrates in accordance with the invention are formed from a felt of mineral fibres. Rock wool which is produced from materials such as basaltic rocks, blast-furnace slag, etc. This rock wool, by virtue of its porosity, may be used to form substrates according to the invention. However, as a result of its manufacturing process, the felt obtained contains a substantial percentage of material not converted into fibres. These are particles having a greater diameter than that of the fibres proper and which play a much smaller part in the formation of the capillary network and, consequently of the hydroretentivity properties.

Glass wool can also be used for the substrates of the invention. The properties of this wool may make it particularly suitable for the formation of substrates for soil-free culture. The present processes for the manufacture of glass fibres, for example that in which the fibres are formed by passing molten material through a centrifugal die, have the advantage of permitting the formation of felts of homogeneous structure. Felts obtained from these fibres, which do not contain any non-fibrous material, are thus lighter than felts of rock wool and display improved hydroretentivity. Felts of glass fibre have, besides, substantial advantages in that they are highly compressible and return to their original thickness when the pressure is relieved, which characteristics permit improved packaging and storage.

To improve the ability of the substrate to accept water, a wetting agent may be added to the mineral fibre felt which forms the substrate. This wetting agent can be introduced during the manufacture of the felt or indeed at any later time. The addition can be carried out by any suitable process such as spraying or dipping.

The examples which follow are given by way of indication in order to illustrate the invention.

In these examples, the substrates are formed of a felt of glass fibres obtained by the well-known process utilising the centrifugal die. According to this process, the fibres are formed by passing the molten material through the orifices of a centrifugal die, they are then drawn out and carried by a strong gaseous current as far as a receiving mat which is mobile and permeable to the gaseous current. When the substrate comprises several layers, these are obtained by depositing fibres from successive centrifugal dies onto the mobile receiving mat.

The hydroretention of the substrates is determined by the following process (see FIG. 6). A container 1 containing a porous material 2, such as sand, saturated with water is used. The base of the container communicates, via a flexible pipe, with a vessel 4, which contains water. The level of the water is maintained constant by an overflow system 5. The position of the vessel 4 can be controlled as desired on a vertical support. The "constant level" is controlled so that the level of water in the sand container is at 37.5 mm above the sand (i.e., half the height of the samples which is equal to 75 mm). Samples 10 cm × 10 cm × 7.5 cm are cut out of a felt of mineral fibres. These are weighed. They are immersed in a container filled with water for 24 hours. The samples (6) are then placed on the sand 2. The constant level is then lowered by a certain amount, in order to submit the substrate to a suction force. The lowering of the level or depression (d) is measured by referring to the height of the middle of the sample. After each depression, the sample is weighed at the end of 24 hours in order to obtain the hydric equilibrium, then it is replaced on the sand and the constant level is lowered once again in order to increase the depression in water.

There is thus obtained the weight of water retained by the substrate and consequently the volume percentage of water with respect to the total volume of the substrate as a function of the suction forces applied to it.

EXAMPLE 1

A substrate I according to the invention is prepared, having a density of 25 kg/m$^3$, containing glass fibres of which the fineness defined by the diameter of the fibres, increases in the direction of gravity.

The substrate has a total thickness of 75 mm and is formed from 3 layers each having a weight per unit area of 600 g/m$^2$. These layers are distributed in the following order from top to bottom, i.e., in the direction of gravity: the first layer includes glass fibres having an average diameter of 4 µm, the second layer glass fibres having an average diameter of 5.6 µm and the last layer fibres having an average diameter of 8 µm.

The hydroretention of substrate 1 is determined as a function of suction forces by means of the procedure described above. It is shown by curve I in FIG. 3. It is established that, for a depression of 10 cm of water, the volume of water retained by the substrate represents a little more than 50% of the total volume of the substrate.

The same sample is taken and utilised in the opposite direction, i.e., such that the upper layer of the substrate I, which contains the finest fibres, forms the bottom layer of the substrate (referred to as substrate II).

A substrate II is therefore obtained in which the fineness of the fibres decreases in the direction of gravity.

Curve II in FIG. 3 gives the hydroretention of substrate II. It may be seen that, for a depression of 10 cm of water, the volume of water retained by the substrate is less than 40%. Thus, the substrate (II), in which the finest fibres are located in the lowest part and the coarsest fibres at the surface, retains less water than the substrate (I) of identical structure, but inverted.

EXAMPLE 2

Figure 4:
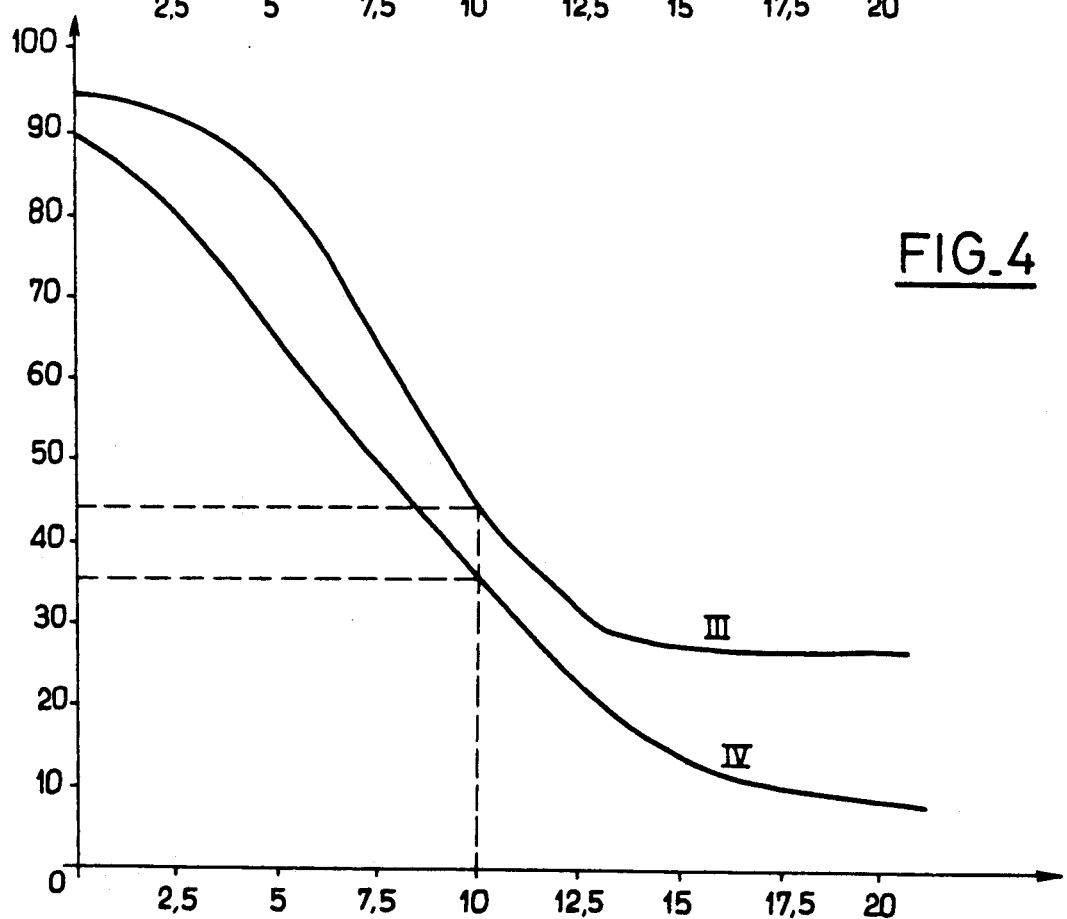

A substrate III of density 25 kg/m$^3$, having a total thickness of 75 mm comprises 3 layers of glass fibres distributed in the following order from top to bottom: a first layer having a weight per unit area of 300 g/m$^2$ containing fibres having an average diameter of 4 µm; a second layer of weight per unit area of 900 g/m$^2$ comprising fibres having an average diameter of 5.6 µm and a layer of weight per unit area of 600 g/m$^2$ containing glass fibres having an average diameter of 8 µm. The hydroretention curve for substrate III is given in FIG. 4 (curve III). It is established that, for a depression of 10 cm of water, the volume of water retained by the substrate represents about 45% of the volume of the substrate.

A sample of the same substrate III, used in the opposite orientation, with the first layer of fine fibres 4 µm in diameter located at the base of the substrate (substrate IV), displays a hydroretention (about 35% water for a depression of 10 cm of water) which is interior to that of substrate III of the same structure but inverted.

EXAMPLE 3

A substrate V is prepared, as in the previous examples, formed from a felt of glass fibres having a density of 25 kg/m$^3$. The total thickness of the substrate is 75 mm. It includes two layers distributed as follows from top to bottom: a layer having a weight per unit area of 600 g/m$^2$ containing glass fibres having an average diameter of 4 µm and a layer having a weight per unit area of 1200 g/m$^2$ containing glass fibres having an average diameter of 5.6 µm.

The curves showing the hydroretention of substrate V and substrate VI, of identical structure inverted with respect to one another, are given in FIG. 5. It is established that, for a depression of 10 cm of water, the water retained by substrate V represents more than 60% of the substrate and the water retained by the substrate VI represents more than 45% of it.

It may be noted that, when the finest layers are in the upper part of the felt, the hydroretention of the substrate is higher.

Having studied the above-mentioned curves, it may be said that, in order to obtain a higher retention of water, it is preferred that the average diameter of the fibres increases in the direction of gravity (curves I, III and V).

In the previous examples, the volume percentage of water retained in the whole substrate has been given.

In the following example, the volume percentage of water retained by each layer of the fibres forming the substrate is determined in order to show that it is possible, in accordance with the invention, to control the water content within the substrate and to obtain a constant hydroretention over its whole thickness, by creating, within its thickness, a hydroretentivity gradient.

EXAMPLE 4

Substrate A: Reference

A substrate having a total thickness of 100 mm is prepared by superimposing four layers of glass fibres 25 mm thick and of similar density. The four layers contain fibres of the same average diameter, 8 μm, there is thus obtained a substrate having an analogous structure to the conventional substrates, i.e., displaying neither a density gradient, nor a gradient in fibre fineness.

Substrate A is immersed in water, then the water is allowed to escape, by natural drainage, for 10 minutes.

The volume percentages of water contained in each of the layers after drainage are indicated in the following table.

| Substrate | Layers | Fibre Diameter | Water retention (%) |
|---|---|---|---|
| A | 1 | 8 μm | 36.6 |
|   | 2 | 8 μm | 77.8 |
|   | 3 | 8 μm | 96.8 |
|   | 4 | 8 μm | 98.2 |

It is noted that as the average diameter of the fibres is the same over the whole substrate, the retention of water is greater in the lower layers.

Substrate B

A substrate B is prepared, analogous to substrate A, but in which the first layer (layer 1) contains fibres having an average diameter of 4 μm.

The volume percentages of water retained by substrate B are indicated below:

| Substrate | Layers | Fibre Diameter | Water retention (%) |
|---|---|---|---|
| B | 1 | 4 μm | 99 |
|   | 2 | 8 μm | 57 |
|   | 3 | 8 μm | 97.6 |
|   | 4 | 8 μm | 99.6 |

The three last layers 2, 3 and 4 of this substrate B, having similar density and containing fibres of the same diameter, form a part of the substrate which does not display either a density gradient nor a fineness gradient, and which therefore has a structure corresponding to that of the conventional substrates. It also displays disadvantages in that the water accumulates by gravity in the lower layers which contain more water than the upper layers.

The layer (1) containing the finest fibres (4 μm) permits there to be created a layer having high water retention at the surface.

Substrate C

Substrate B is compared to a substrate C having a total thickness of 100 mm obtained by superimposing 4 layers of glass fibres 25 mm in thickness, which are arranged in the following order from top to bottom.

Layer (1) comprises fibres having an average diameter of 4 μm;

Layer (2) contains fibres having an average diameter of 5.6 μm;

Layers (3) and (4) contain fibres having an average diameter of 8 μm.

As in the case of substrate B, the volume percentages of water contained in each layer of substrate C are evaluated after a period of natural drainage of 10 minutes. The results are indicated in the following table:

| Substrate | Layers | Fibre Diameter | Water retention (%) |
|---|---|---|---|
| C | (1) | 4 μm | 97.7 |
|   | (2) | 6 μm | 92.4 |
|   | (3) | 8 μm | 93.5 |
|   | (4) | 8 μm | 97.5 |

It is established that substrate C is distinguished from substrate B in that it includes in layer (2) fibres of smaller diameter (5.6 μm instead of 8 μm in substrate B). In substrate C, the average diameter of the fibres increases in the direction of gravity, in accordance with the invention. It is noted that by using such a substrate, a hydroretention is obtained which is approximately constant over the whole thickness of the substrate.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. Substrate for soil-free cultivation formed from a felt of mineral fibres, suitable for the supply of water or an aqueous nutrient solution to plants, comprised of a porous, fibrous felt having opposed major first and second surfaces, said first surface being above said second surface when said felt is horizontally disposed as a substrate for soil-free cultivation, wherein said felt has a heterogeneous fibrous structure displaying a hydroretentivity gradient such that the hydroretentivity gradient decreases in the direction from said first surface to said second surface, such that said gradient is opposed to the direction of gravity when said substrate is horizontally disposed and employed as a substrate for soil-free cultivation.

2. Substrate according to claim 1, wherein the hydroretentivity gradient is obtained by a forming said felt with a density gradient in the direction of decreasing from said first surface to said second surface.

3. Substrate according to claim 2, wherein the density of said fibre felt is between 15 and 60 kg/m$^3$.

4. Substrate according to claim 1, wherein the hydroretentivity gradient is obtained by gradients in density and fineness from said first surface to said second surface.

5. Substrate according to claim 4, wherein the average diameter of the fibres of said felt is between 2 and 12 µm.

6. Substrate according to claim 5, characterised in that it is essentially comprised of fibres, in a layer adjacent to said first surface, of an average diameter between 2 µm and 5 µm.

7. Substrate according to claim 4, wherein the density of said fibre felt is between 15 and 60 kg/m$^3$.

8. Substrate according to claim 7, wherein said felt comprises a layer adjacent to said first surface having a density between 30 and 60 kg/m$^3$.

9. Substrate according to any of claim 1, comprised of a plurality of layers of fibres at least two of said layers having a different density.

10. Substrate according to claim 1, comprised of a plurality of layers, at least two of said layers being essentially comprised of fibres which, in the different layers, have a different average diameter.

11. Substrate according to claim 1, comprised of a plurality of layers, wherein at least two of said layers have a different density, and wherein at least two said layers, which may be the same or different from those having different densities are essentially comprised of fibres, the fibre one of said layers having fibres whose average diameter is different from that of the fibre of said second layer.

12. A substrate for soil-free cultivation formed from a felt of mineral fibres, suitable for the supply of water or an aqueous nutrient solution to plants, comprised of a porous, fibrous felt having opposed major first and second surfaces, wherein said felt has a heterogeneous fibrous structure displaying hydroretentivity gradient such that the hydroretentivity decreases in the direction from said first surface to said second surface, said hydroretentivity gradient being obtained by forming said felt with a gradient in the fineness of the fibres increasing from said first surface to said second surface.

13. Substrate according to claim 12 wherein the average diameter of the fibres of said felt is between 2 and 12 µm.

14. A method for soil-free cultivation, comprising cultivating plants on a substrate formed from a felt of mineral fibres, suitable for the supply of water or an aqueous nutrient solution to said plant, said substrate being comprised of a porous, fibrous felt having opposed major first and second surfaces, wherein said felt has a heterogeneous fibrous structure displaying a hydroretentivity gradient such that the hydroretentivity decreases in the direction from said first surface to said second surface, said cultivation comprising growing plants on said substrate such that the roots of said plants are disposed toward said second surface, and said plants grow in the direction above said first surface.

* * * * *

UNITED STATES PATENT AND TRADEMARK OFFICE
CERTIFICATE OF CORRECTION

PATENT NO. : 5,009,030
DATED : April 23, 1991
INVENTOR(S) : Bernard Kafka et al.

It is certified that error appears in the above-identified patent and that said Letters Patent is hereby corrected as shown below:

On the title page:

The Foreign Application Priority Data has been omitted, should be, --Oct. 2, 1987 [FR] France..........87 13,625--.

Signed and Sealed this

Sixth Day of October, 1992

Attest:

DOUGLAS B. COMER

Attesting Officer

Acting Commissioner of Patents and Trademarks